(12) United States Patent
Hiruma et al.

(10) Patent No.: US 7,776,400 B2
(45) Date of Patent: Aug. 17, 2010

(54) WIPER BLADE AND METHOD FOR PRODUCING THE SAME

(75) Inventors: Nobuyuki Hiruma, Saitama (JP); Masahide Takahashi, Saitama (JP); Yoshinari Shizukuda, Saitama (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 0 days.

(21) Appl. No.: 11/905,921

(22) Filed: Oct. 5, 2007

(65) Prior Publication Data

US 2008/0040880 A1     Feb. 21, 2008

Related U.S. Application Data

(62) Division of application No. 10/486,335, filed as application No. PCT/JP02/06475 on Jun. 27, 2002.

(30) Foreign Application Priority Data

Aug. 30, 2001   (JP)  ............... 2001-262164

(51) Int. Cl.
    *B05D 3/02*     (2006.01)
(52) U.S. Cl. .................... 427/387; 427/393.5
(58) Field of Classification Search ............... 427/393.5
See application file for complete search history.

(56) References Cited

U.S. PATENT DOCUMENTS 5,283,927 A * 2/1994 Gibbon et al. ........... 15/250.48
5,610,213 A * 3/1997 Sumpter et al. ............. 524/267
5,623,028 A * 4/1997 Fitzgerald et al. ........... 525/474
5,716,699 A * 2/1998 Reo ........................... 428/325

FOREIGN PATENT DOCUMENTS

| EP | 1059213 | * 12/2000 |
|---|---|---|
| JP | 55-15873 | 2/1980 |
| JP | 05-077690 | 3/1993 |
| JP | 07-323825 | 12/1995 |
| JP | 09-194727 | 7/1997 |

(Continued)

OTHER PUBLICATIONS

Translation of JP 2001-055119, Feb. 2001.*
International Search Report issued Oct. 11, 2002 in the International (PCT) Application of which the present application is the U.S. National Stage.

*Primary Examiner*—Erma Cameron
(74) *Attorney, Agent, or Firm*—Wenderoth, Lind & Ponack, L.L.P.

(57) ABSTRACT

A wiper blade (1) comprising a base portion (3) to be attached to a wiper arm, a lip portion (4) to sweep away a water droplet or dust etc. adhered to a glass window, a thin neck portion (2) for connecting the lip portion (4) and the base portion (3), and a sweeping surface layer portion formed on a side surface of a cross section of the lip portion (4), the sweeping surface layer (7) comprising a scale-like powder (9) having good sliding property and a binder (10) comprising a water-repellency silicone-base rubber composition for binding the scale-like powder (9) to the lip portion (4). The scale-like powder (9) is laminated in a thickness direction of the lip portion (4) and the laminated scale-like powder is bound to each other with the binder (10).

5 Claims, 6 Drawing Sheets

FOREIGN PATENT DOCUMENTS

| | | |
|---|---|---|
| JP | 09-296136 | 11/1997 |
| JP | 10-24803 | 1/1998 |
| JP | 10-95314 | 4/1998 |
| JP | 11-321573 | 11/1999 |
| JP | 2000-160018 | 6/2000 |
| JP | 2000-190821 | 7/2000 |
| JP | 2001-55119 | 2/2001 |
| JP | 2002-20695 | 1/2002 |

* cited by examiner

WIPER BLADE AND METHOD FOR PRODUCING THE SAME

This is a divisional application of U.S. patent application Ser. No. 10/486,335, filed Feb. 10, 2004, which is the National Stage of International Application No. PCT/JP02/06475, filed Jun. 27, 2002.

TECHNICAL FIELD

The present invention relates to a wiper blade used for cars, trains, ships, aircrafts etc., to ensure good visibility while driving by sweeping away rainwater, muddy water, snow, sleet, dust etc., adhered to the surface of the window glasses.

BACKGROUND ART

A wiper installed at such a front window or a rear window of various transportation means such as cars, trains, ships, aircrafts etc. comprises a wiper blade to sweep away droplets or dust adhered to a glass surface, and a wiper arm to support the wiper blade. At a contact portion of the wiper blade which contacts with glass, natural rubber has been mainly used, but other rubbers such as chloroprene rubber, styrene-butadiene rubber, EPDM (ethylene-propylene-diene copolymer) rubber or blended composition of these rubbers have also been used.

Recently, as a method to secure good driving visibility even in wet weather, a method to make a contact angle of water droplets adhering to the glass surface more than 90° by applying a water repellent agent on the surface of the glass and then forming a water repellent layer thereon has been widely used. The water repellent layer makes it easier for water droplet to slip off the glass surface when cars are stopped, and also makes it easier for the droplet to be blown off by the wind power generated on the glass surface when cars are driven, fairly improving visibility without frequent operation of wipers.

However, even after such surface treatment is finished, there still remains a need to sweep away foreign materials adhering to the glass surface by operating wipers for safer driving. But when the wiper is operated on the glass surface coated with the water repellent agent, the water repellent layer is gradually scraped away by repeated rubbing of the wiper blade, reducing deterioration in water repellency in comparatively short period of time. Therefore, there was a need to frequently apply the water repellent agent on the glass surface. In addition, there has been a problem that if the wiper is operated when the water repellent layer is in the beginning of peeling, fluttering occurs in the wiper, being unable to operate the wiper smoothly.

As a method to solve such problems, the inventors of the present invention learned that the lifetime of the water repellency of the water-repellent-agent-coated layer can be extended to be able to considerably reduce the frequency of applying the water repellent agent by using silicone compound as the material of the wiper blade held by the wiper arm, being able to provide a wiper which is considerably improved in wiping properties when compared with the conventional one (JP-A-11-321573, JP-A-2000-160018).

As more and more requirements for quietness in transportation means are requested in these days, further improvement in sliding property as well as quietness of the sweeping operation are requested. The inventors of the present invention have provided a new wiper blade by adhering a powder to give a good sliding property to a lip portion of the wiper blade (JP-A-2000-55119). As a result, a wiper blade having an excellent sliding property and quietness has been practically used.

DISCLOSURE OF THE INVENTION

Therefore, the problem to be solved of the present invention is to provide a wiper blade capable of extending durability of such properties as quietness and good sliding property and capable of assuring more stable quality by further improving the wiper blade having a powder which gives good sliding property.

To solve such problems, a first aspect of the present invention is characterized in that a wiper blade comprising;

a base portion to be attached to a wiper arm, a lip portion to sweep away a water droplet or dust etc. adhered to a glass window, a thin neck portion for connecting the lip portion and the base portion, a sweeping surface layer portion formed on a side surface of a cross section of the lip portion, the sweeping surface layer comprising a scale-like powder having good sliding property and a binder comprising a water-repellency silicone-base rubber composition for binding the scale-like powder to the lip portion, the scale-like powder being laminated in a thickness direction of the lip portion and the laminated scale-like powder being bound to each other with the binder, and an outermost scale-like powder, which is located at the outermost layer, being exposed on the surface of the sweeping surface layer portion.

According to the first aspect, the sweeping surface layer portion is brought into contact with a water repellent layer in a surface-to-surface contact manner so that scraping action scraping away the water repellent layer can be extremely suppressed due to the excellent sliding property of the sweeping surface layer portion despite the fact that the imperfect wiping is not observed. In addition, since the laminated scale-like powder is bound to each other by the binder, a portion of the binder which falls off with the progress of abrasion after it can no longer bear the friction of sweeping is filled up into a scraped portion of the water repellent layer so that optimum sweeping characteristics and good sliding properties can be exerted for a long period, and quietness can be maintained, because the water repellency effect is not damaged.

The second aspect is characterized in that in addition to the first aspect, the lip portion has a front edge surface on which the sweeping surface layer portion is provided.

According to the second aspect, in addition to the effect of the first aspect, generation of fluttering or scraping away of water repellent layer can be suppressed, because good sliding property can be ensured in a case the front edge surface of the lip portion contacts the glass window or water repellent layer at the time of inversion of the lip portion when moving direction of the reciprocating wiper blade is turned around.

The third aspect of the present invention is characterized in that in addition to the first or second aspect, when a sweeping operation of the wiper blade is repeated, the scale-like powder exposed on the surface of the sweeping surface layer and the binder falls off with the proceeding of the sweeping operation, and a new scale-like powder emerges.

According to the third aspect, in addition to the effect of the first or second aspects, good sliding properties can be maintained for a long period of time.

The fourth aspect of the present invention is characterized in that in addition to the third aspect, the surface roughness of the sweeping surface layer portion is in the range of 0.8~5 μm in terms of a center-line-average roughness. The center-line-average roughness, which is defined by JIS-B0601, is an average value (Ra) which is calculated by selecting a portion having a length I in a center line direction from a roughness curve and then by summing up and averaging an absolute value of a deviation from a center line of the selected portion to a curve to be measured.

According to the fourth aspect, the surface roughness of the sweeping surface layer portion is extremely smooth. In addition to the third aspect, good sliding property and good sweeping property can be obtained without fluttering phenomena.

The fifth aspect of the present invention is characterized in that in addition to the fourth aspect, the lip portion is made of a silicone base rubber composition. And a compounding ratio of the scale-like powder to the binder in the sweeping surface layer portion is 1 to 0.3~1.2 by weight and the adhering amount of the scale-like powder is in the range of 0.1~5 mg/cm$^2$.

According to the fifth aspect, in addition to the effect of the fourth aspect, a wiper blade having sliding property and sweeping property can be provided while maintaining appropriate fixing force to fix the scale-like powder.

The sixth aspect of the present invention is characterized in that in addition to the fifth aspect, the thickness of the sweeping surface layer portion is in a range of 3~40 μm.

According to the sixth aspect, since there is no fear of generation of a crack while maintaining sufficient thickness of the sweeping surface layer portion, in addition to the effect of the fifth aspect, a wiper blade, whose quietness and sliding property can be maintained for a long period of time, can be provided.

The seventh aspect of the present invention is characterized in that in addition to any one of the first to sixth aspect, the wiper blade sweeps a window glass with a water repellent layer formed on the surface of the window glass using a water repellent silicone base compound.

According to the seventh aspect, in addition to the effect of any one of the first to sixth aspect, a component fallen off from the lip portion whose component is similar to the water repellent layer or a component fallen off from the binder is rubbed into a place, where a portion of the water repellent layer is scraped away, to bind with the water repellent layer so that effect of repairing of the water repellent layer can be further improved.

The eighth aspect of the present invention is characterized in that in addition to the seventh aspect, the silicone base compound is an alkoxysilane compound.

According to the eighth aspect, in addition to the effect of the seventh aspect, water repellency and binding force to the glass by alkoxy group can be improved so that the durability of the water repellent layer itself can be further improved.

The ninth aspect of the present invention is characterized in that a method for producing a wiper blade comprising a base portion to be attached to the wiper arm, a lip portion to sweep away a water droplet or dust etc. adhered to a glass window and a thin neck portion for connecting the lip portion and the base portion, which comprises;

coating the lip portion with a solution comprising a silicone base rubber composition, a scale-like powder and a platinum catalyst, and curing the silicone base rubber composition by heating the wiper blade coated with the solution at 150~200° C. for 5~30 minutes, to form a sweeping surface layer portion on the lip portion.

According to the ninth aspect, since the sweeping surface layer portion can be cured in a short period of time, productivity of the wiper-blade having the sweeping surface layer portion can be improved.

BEST MODE FOR CARRYING OUT THE INVENTION

Embodiment of the present invention will be precisely described hereunder with reference to the accompanying drawings.

Figure 1:
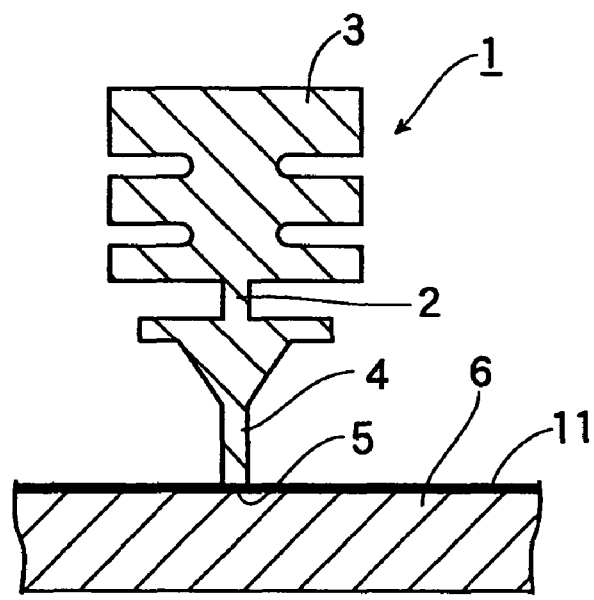
FIG. 1 is a schematic sectional view in a stationary state showing an example of a wiper blade of the present invention.

FIG. 1 is a schematic sectional view in a stationary state showing an example of a wiper blade of the present invention, in which numeral number 1 denotes a wiper blade having a lip portion 4 at a front edge of a base portion 3 having a neck portion 2 at the midpoint thereof and a front edge surface 5 provided at an end edge of the lip portion, which contacts a surface of a glass window 6 provided with a water repellent layer 11.

The water repellent layer 11, which is applied on the surface of the glass window 6, is formed by using a silicone base compound such as a dimethyl silicone compound, an alkoxysilane compound etc., more preferably, a trialkoxysilane compound.

As an alkoxy group, a methoxy group or an ethoxy group can be usually used. And a chemical group selected from a group of methyl group etc. and fluoroalkyl group is exemplified as a group which relates to water repellency. A fluoroalkyl group can be represented by the following general chemical formula,

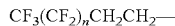

where the group having n=0~8 can be used more preferably.

A strong acid or a strong alkali can be used as a catalyst in order to improve bondability to the glass by facilitating hydrolysis of the alkoxy group. The catalyst can be selected from hydrochloric acid, nitric acid, sulfonic acid, aromatic sulfonic acid, aliphatic sulfonic acid, sodium hydroxide, potassium hydroxide etc. As a solvent, such an alcohol as methanol, ethanol, n-propanol, isopropyl alcohol etc. is preferably used.

Any material which has been conventionally used as a wiper blade can be preferably used as a material for the base portion 3 of the wiper blade 1. The same material used in the lip portion 4, for example, general purpose rubber such as silicone base rubber, natural rubber, chloroprene rubber, EPDM etc. can be used as a material for the base portion 3. Preferable hardness of the base portion 3 is in the range of 50~80 when measured by Durometer Type A defined by JIS-K6253. Silicone base rubber composition is used for the material of the lip portion 4. If necessary, a reinforcing filler or additives to improve sliding property can be added. Of course the base portion can be made solely of silicone base rubber composition.

As a silicone raw rubber for use in the silicone base rubber composition, dimethyl silicone raw rubber, methyl vinyl silicone raw rubber, methyl phenyl vinyl silicone raw rubber, fluoro silicone raw rubber etc. are exemplified. These rubbers may be used not only as a single material but also as a blended material of more than two kinds of rubbers within the range the necessary properties can be satisfied. Preferable hardness of the lip portion 4 after the curing of the silicone base rubber composition is in the range of 50~80 when measured with Durometer Type A defined by JIS-K6253. Sweeping property becomes deteriorated when the rubber hardness is lower than 50 as well as higher than 80.

The wiper blade 1 of the present invention can be produced by a method selected from a compression molding, an extrusion molding, an injection molding etc. In such a case as the wiper blade 1 made up of a several kinds of materials, a combined compression molding, a multilayer extrusion molding, a combined injection molding etc. can be used, or combining parts produced separately together by bonding process can also be used.

Condition for compression molding or injection molding is set up preferably in the range of 150~190° C., more preferably 160~180° C., in view of moldability and productivity. In case of extrusion molding, a temperature inside the oven is set up in the range of 200~400° C. in view of a heating time. In addition, when curing is carried out by a condensation reaction using an organic peroxide, unreacted agents in the molded goods is removed when a secondary cure is carried out using a forced draft vent type oven, improving mechanical strength etc. The secondary cure is generally carried out in the range of preferably 180~210° C. for 1~4 hours.

Although, molding, can be carried out using various kinds of molds such as one-cavity (single) mold, composite mold etc., it is preferable to use a two-cavity mold in which the front edge surface 5 sides of the lip portions 4 are united with each other and to cut off a molded article at a central portion of the united portion with an edged blade, since a corner portion 8 of the lip portion 4 can be made sharp-edged, which is preferable in ensuring good sweeping property. As for a method of cutting the molded article produced by the two-cavity mold, such a cutting method can be exemplified as cutting by placing a blade on one side of the molded article, or by placing blades on both upside and downside. A pulling type cutting, a pushing type cutting, or a rotary blade type cutting can also be used. Since it is especially preferable to make the corner portion 8 of the lip portion 4 sharp- and straight-edged, it is preferable to adopt a cutting method by placing blades on both upside and downside of the molding article though the shape of the blade for cutting can be selected arbitrarily.

Figure 2:
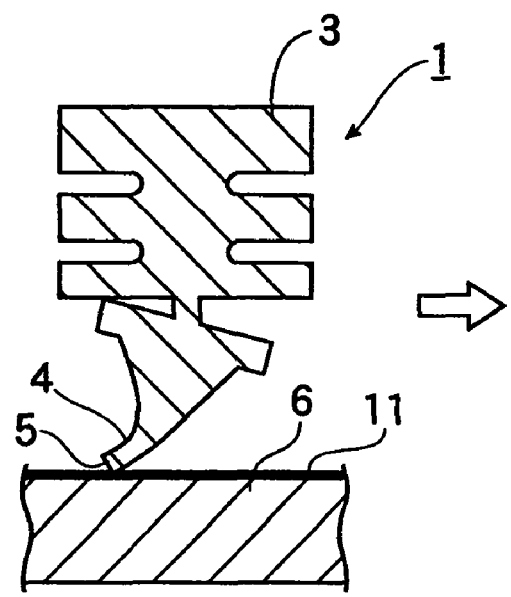
FIG. 2 shows an example of the wiper blade of the present invention, and a schematic sectional view in an operating state.

FIG. 2 shows an example of the wiper blade of the present invention, and a schematic sectional view in an operating state.

When the wiper blade 1 is in operation, the wiper arm (not shown), to which the base portion 3 is fixed, is moved reciprocally on the surface of the glass window 6 so that a sweeping resistance arises on the lip portion 4 of the wiper blade 1 at the time the glass window 6 is swept. Therefore the lip portion 4 is inclined around the neck portion 2 in a direction opposite to a direction of the movement (refer to an arrow in FIG. 2) of the wiper blade 1, making the side of the lip portion 4 sweep the glass window 6.

Figure 3:
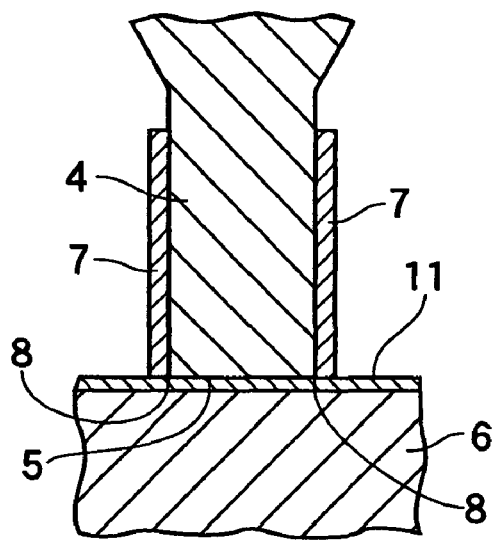
FIG. 3 shows an example of the wiper blade of the present invention and an enlarged schematic sectional view of an essential part of FIG. 1.

FIG. 3 shows an enlarged schematic sectional view of an essential portion of FIG. 1. On the side surface of the cross section of the lip portion 4, a sweeping surface layer portion 7 is provided upward, except on the front edge surface 5, in a predetermined area from the front edge surface 5 toward the base portion 3 side.

The sweeping surface layer portion 7 which is designed to improve the sliding property of the wiper blade 1 is provided by preferably cutting the central portion of the molded article molded by using the two-cavity mold, in which the front edge surface 5 sides of the lip portions 4 are united with each other, after forming the sweeping surface layer portion 7 by coating, dipping etc. In other words, forming the sweeping surface layer portion 7 only on the side of the cross section of the lip portion 4 is sufficient to meet the needs from the view point of the sweeping property. In a case where there is a need to suppress the amount of abrasion of the water repellent layer 11, the sweeping surface layer portion 7 may also be provided on the front edge surface 5 of the lip portion 4.

Figure 4:
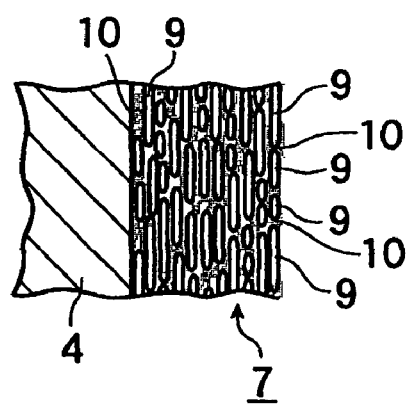
FIG. 4 shows an example of the wiper blade of the present invention and a further enlarged sectional view of a sweeping surface layer portion of FIG. 3.

FIG. 4 shows a further enlarged sectional view of a sweeping surface layer portion of FIG. 3.

The sweeping surface layer portion 7 comprises a powder 9 and a resin as a binder 10 for fixing the powder 9 on the surface of a sweeping region. The powder 9, which is bound to the surface of the lip portion 4, is used to aim to improve the sliding property and such materials as graphite, mica etc. can be exemplified. These materials can be used alone or by blending two or more of them if performance meets the needs.

As for the shape of the powder 9, a scale-like shape is more preferable than the spherical one. For example, if a spherical one having a large diameter is used, sliding property shows good but the sweeping property becomes degraded considerably because of the increase in the surface roughness. Whereas if a spherical one having a small diameter is used, the sweeping property is not degraded but good sliding property can not be realized.

Further when a spherical powder is used, contact between each particle becomes a point contact because of its spherical shape so that increase in the amount of the binder is necessary for binding each particle. The increased amount of the binder tends to degrade sliding property. On the other hand, when the amount of the binder becomes smaller, sliding property at its initial stage is good but falling off of the particles are observed frequently, being unable to obtain a sliding durability for a long period of operation.

That is, the scale-like powder 9, which easily builds up in layers when compared with other three dimensional powder such as spherical powder or the like, is easily formed into a smooth sweeping surface layer portion 7 having a large number of layers with small amount of the binder, giving a good balance between sliding property and durability of the sliding property.

The particle diameter of the powder 9 is preferably in the range of 0.3~60 μm, more preferably 1~60 μm when measured by sedimentation type particle size distribution analysis.

The scale-like powder 9 such as graphite, mica etc., which has a scale-like shape, has a strong tendency to agglomerate when the powder includes a size less than 0.3 μm that is measured by sedimentation type particle size distribution analysis, causing difficulties in handling. On the contrary, when the powder includes a size larger than 60 μm and when the wiper blade 1 is mounted on the glass window 6 and used, the wiper blade insufficiently contacts with the glass window 6 resulting in an insufficient wiping of water and leaving unwiped portion.

The scale-like powder 9 such as graphite, mica etc. having scale-like shape has a tendency to build up to each other in a thickness direction of the sweeping surface layer portion 7 in a manner similar to fish's scales, when the sweeping surface layer portion 7 is formed.

The sedimentation type particle size distribution analysis will be explained which is applied to determine the particle size distribution of the scale-like powder 9 which is used in the sweeping surface layer portion 7.

The sedimentation analysis is the most typical method to determine particle size distribution using phenomena that sedimentation velocity in fluid has a relationship with the particle size. The particle size distribution can be determined by measuring a particle concentration with time, which can be carried out by an integration method in which total concentration is measured at a region above a depth H or below the depth H, an incremental method in which concentration of the particle is measured at the depth H, etc. Further the integration method includes a sedimentation balance method, a hydrometer method, a pressure method etc. and the incremental method includes a pipet method, a specific gravity balance method, a light transmission method, an X-ray transmission method etc. In the present invention, the particle size distribution was obtained by a light transmission method using a centrifugal sedimentation method, which is classified as the incremental method, under the condition at a temperature of 23±2° C., humidity 50±10% and using distilled water as a dispersing medium.

Hardness represented by Durometer Type A of a silicone base rubber composition as the binder 10 which is used for binding the scale-like powder 9 is preferably in the range of 40~70 when it is cured and measured based on JIS-K6253. When the rubber hardness is under 40, satisfactory sliding property can not be achieved. When over 70, the silicone base rubber composition tends to be damaged by foreign materials adhered on the surface of the glass window 6 having the water repellent layer, causing a streak-like sweep line. Dimethyl silicone raw rubber, methyl vinyl silicone raw rubber, methyl phenyl vinyl silicone raw rubber, fluoro silicone raw rubber etc. can be exemplified as a silicone raw rubber which is used in the silicone base rubber composition. These rubbers can be used alone or as a mixture of two or more kinds thereof if necessary characteristics can be secured.

The surface roughness of the sweeping surface layer portion 7 is preferably in the range of 0.8~5 μm in terms of center-line-average roughness (Ra) measured based on JIS-B0601, more preferably 1~3 μm. When the roughness (Ra) is less than 0.8 μm, the sliding property becomes deteriorated and fluttering tends to generate, being undesirable. When the roughness (Ra) is more than 5 μm, the sliding property becomes desirable but the sweeping property becomes deteriorated, being also undesirable.

As a reinforcing filler to improve the physical strength of the silicone base rubber composition, a reinforcing fine silica powder is preferably used. The particle diameter of the silica is preferably in the range of 0.005~0.03 μm and the compounding ratio is preferably in the range of 10~25% in terms of volume filling ratio. When the volume filling ratio is less than 10%, sufficient reinforcing effect can not be obtained, and when more than 25%, such procedure as mixing, molding etc. become difficult. Curing of the silicone base rubber composition can be carried out preferably using condensation reaction or addition reaction, although the curing can be carried out by ordinary methods. As a curing agent in case of the condensation reaction, organic peroxide is generally used. For example, dicumyl peroxide, benzoyl peroxide, 2,5-dimethyl-2,5bis(t-butyl peroxy)hexane etc. can be exemplified. When addition reaction is used for curing, an additional reaction of hydro group and vinyl group using platinum base catalyst can be exemplified. More precisely, it is preferable to add 0.2~1.4 parts by weight of platinum catalyst based on 100 parts by weight of silicone rubber solution (active constituent: 30%), so that decrease in bonding strength of the binder 10 which derives from vulcanization inhibition due to the large amount of mixing ratio of the scale-like powder 9 or the presence of sulfur element etc. existing in graphite can be prevented.

The compounding ratio of the scale-like powder 9 to the binder 10 in the sweeping surface layer 7 is 1 to 0.3~1.2 by weight. And the adhering amount of the scale-like powder 9 is preferably in the range of 0.1~5 mg/cm². When the adhering amount of the scale-like powder 9 is less than 0.1 mg/cm², good sliding property can not be achieved, on the contrary when over than 5 mg/cm², sweeping property becomes deteriorated.

The adhering amount of the scale-like powder 9 is measured by the following steps. That is, when the scale-like powder 9 is first adhered onto a two-juncturally-connected wiper blade body, which is molded using a two-cavity mold, and then fixed with silicone base rubber composition, the adhering amount is calculated based on a difference in weight between before and after adhesion of the scale-like powder 9. When a mixed solution having the scale-like powder 9 and the silicone base rubber composition as a binder 10 is spray-coated, the adhering amount is calculated based on a difference in weight between before spray-coated and after spray-coated and dried two-juncturally-connected wiper blade body.

Similarly, the adhering amount of the silicone base rubber composition of the binder 10, which fixes the scale-like powder 9, is preferably in the range of 0.05~5 mg/cm². When the adhering amount of the silicone base rubber composition is less than 0.05 mg/cm², the scale-like powder 9 can not be sufficiently fixed. On the contrary when over 5 mg/cm², the scale-like powder 9 can be fixed sufficiently but sliding property becomes deteriorated, being undesirable.

It is desirable to control the thickness of the sweeping surface layer portion 7 within the range of 3~40 μm. When the thickness of the sweeping surface layer portion is less than 3 μm, the scale-like powder 9 with a particle diameter of 0.3~60 μm can not exist in a plurality of layers necessary to maintain a predetermined durability, being undesirable because durability in practical use falls short of expectation though the sliding property in the initial stage is satisfactory. In addition, when the thickness of the sweeping surface layer portion 7 exceeds 40 μm, there is a fear of crack generation in the sweeping surface layer portion 7, causing undesirable deterioration in sweeping property.

Fixing of the scale-like powder 9 to the front edge portion of the lip portion 4 is carried out by adhering the scale-like powder 9 on the molded wiper blade 1, covering it with the silicone base rubber composition of the binder 10 which is used for fixing the scale-like powder 9 and then curing, or by laminating the scale-like powder 9 dispersed in the silicone base rubber composition on the wiper blade 1. Adhering of the scale-like powder 9 can be carried out using a vertical type, horizontal type, V type or S type tumbler or powder coating machines.

Spray coating, dipping etc. can be exemplified as a method to coat the scale-like powder 9 with the silicone base rubber composition. In these cases, the silicone base rubber composition is previously adjusted to have an appropriate concentration in such an appropriate solvent as toluene. Lamination by using the silicone base rubber composition of the binder 10 in which the scale-like powder 9 is dispersed can be carried out at first by dispersing the scale-like powder 9 into a solution of the silicone base rubber composition using an appropriate solvent such as toluene, and then the lamination is carried out by dipping, spraying, press molding etc. In these processes, it is preferable to perform the same procedure repeatedly to get a desirable thickness of the sweeping surface layer portion 7.

An example of the composition which is used to form the sweeping surface layer portion on the surface of the formed wiper blade 1 by spray coating is prepared by adding and dispersing 5 parts of the scale-like powder 9 into 100 parts of a solution containing 3% by weight of the silicone base rubber composition. The adhering amount of the scale-like powder 9 is approximately controlled within the range of 0.1~5 mg/cm$^2$. The coating or adhering amount of the silicone base rubber composition as the binder 10 is approximately controlled within the range of 0.05~5 mg/cm$^2$. Curing of the silicone base rubber composition of the binder is carried out by heat treatment at a temperature of 150~200° C. for 5~30 minutes after spray coating, more preferably at 180~200° C. for 10~15 minutes.

When the temperature of the heat treatment is lower than 150° C., the time to raise a temperature in the oven can be made shorter but the time to fully cure the silicone base rubber composition becomes longer, being undesirable because the production time becomes longer. Whereas when over 200° C., the time to raise the temperature in the oven becomes longer, being undesirable because there is a fear of thermal degradation of the component of the binder 10.

The binder 10 of the silicone base rubber composition which is used in the present invention is to be cross-linked and hardened by being heated using a platinum catalyst. Hardening of the silicone rubber base composition becomes insufficient when heating treatment is performed at the above-mentioned range of temperature for less than 5 minutes, because the amount of heat is not fully conveyed to the whole part of the wiper blade 1. If hardening is not carried out sufficiently, sliding property becomes deteriorated, causing deterioration in durability of the blade due to the falling off of the sliding property filler at the time of reciprocating movement of the wiper because the force to fix the sliding property fillers to the surface of the wiper becomes weaker. When the heating treatment is performed more than 30 minutes, as a result more heat is supplied than necessary for hardening the rubber, being undesirable because the silicone base rubber composition begins decomposing.

Next, operation and function of the embodiment having structures mentioned above will be described.

When the wiper blade 1 of the present invention is used to sweep the glass window 6 having the water repellent layer 11, a sweeping portion of a front edge of the lip portion 4 is inverted every time the direction of the movement of the wiper blade 1 is changed. When the inversion occurs, a front edge surface 5 of the lip portion 4 contacts the water repellent layer 11, and a corner portion 8 of the lip portion 4 scrapes the water repellent layer 11 in case the sweeping surface layer portion 7 is not provided at a front edge surface 5. Therefore, the water repellent layer 11 is gradually scraped away with the progress of the repeated sweeping operation of the wiper.

Figure 5A:
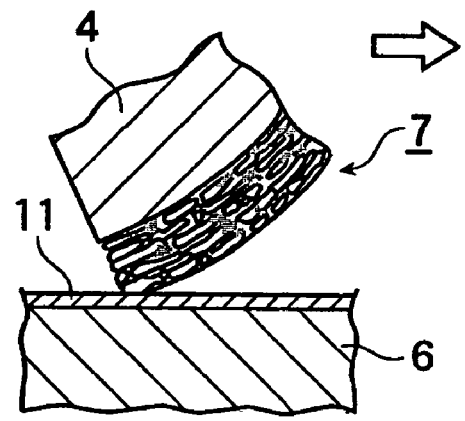
FIG. 5a shows an example of the wiper blade of the present invention and an enlarged sectional view of an essential part for explaining the movement of the sweeping surface layer portion.
Figure 5B:
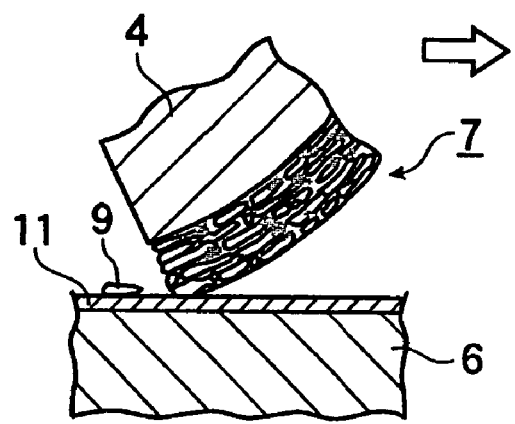
FIG. 5b shows an example of the wiper blade of the present invention and enlarged sectional view, together with FIG. 5a, of an essential part for explaining the movement of the sweeping surface layer portion, FIG. 5b showing a state after repeated sweeping operations.

In the case where the wiper blade 1 of the present invention is used to sweep the glass window 6 which is formed with the water repellent layer 11, the surface of the sweeping surface layer portion 7 is worn away with the progress of the sweeping operation as shown in FIGS. 5a and 5b. And the scale-like powder 9 falls off the sweeping surface layer portion 7 and then transfers onto the water repellent layer 11 on the glass window 6.

Hereinafter the sweeping operation of the wiper blade 1 of the present invention will be precisely explained with reference to FIG. 4 to 7.

Figure 6:
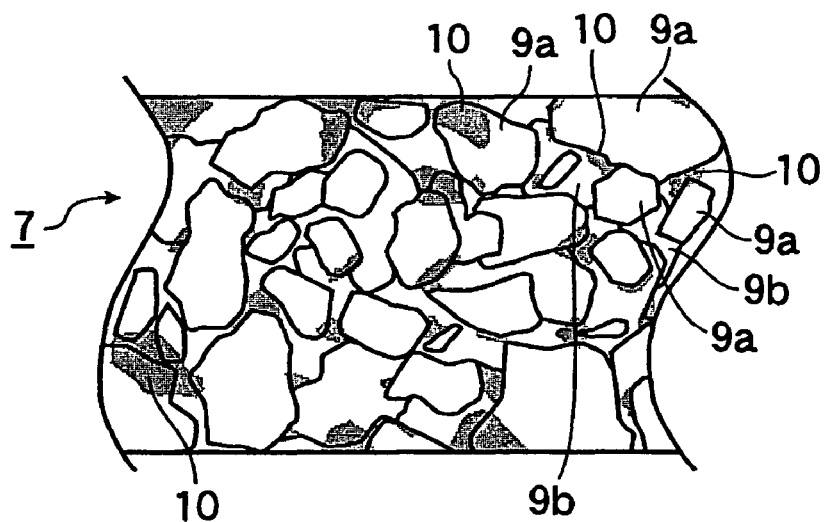
FIG. 6 shows an example of the wiper blade of the present invention and an enlarged view of an essential portion of the sweeping surface layer portion viewed from a longitudinal direction of the sweeping surface layer portion.

FIG. 6 is an enlarged view of an essential portion of the sweeping surface layer portion viewed from a longitudinal direction of the sweeping surface layer portion. FIG. 7 is an enlarged explanatory drawing schematically showing a relationship between the sweeping surface layer portion and the glass window.

As shown in FIGS. 4 and 7, the scale-like powder 9 of the wiper blade 1 of the present invention is laminated in the thickness direction of the sweeping surface layer portion 7 and bonded to each other by the binder 10. Therefore, as shown in FIG. 5, the surface of the sweeping surface layer portion 7, which contacts the water repellent layer 11, is in a state that a scale-like powders 9b, 9b, —which are disposed at an inner place than that of a scale-like powders 9a, 9a, —and can be seen between the scale-like powders 9a, 9a—which are adjacently disposed to each other along a longitudinal direction of the sweeping surface layer portion 7 which is placed on the surface portion.

Further, on the surface of the scale-like powder 9a, 9a, —, which are disposed at a surface portion, the binder 10 is studded. Therefore, the surface of the scale-like powder 9 is not completely covered by the binder 10 so that the surface of the scale-like powder 9 can contact the water repellent layer 11 though the scale-like powder 9 is bound by the binder 10. Accordingly, good sliding property of the wiper blade 1 can be maintained. Furthermore, since mixing ratio of the binder to the scale-like powder 9 is kept low, the binding force of the binder 10 becomes small. Therefore, the scale-like powder 9a which is disposed at the surface portion gradually falls off with the progress of the sweeping operation. When the scale-like powder 9a placed on the surface portion falls off, the scale-like powder 9b which is placed at an inner portion appears onto the surface, being able to maintain the good sliding property. In addition, since the adhering amount of the binder 10 is controlled as previously described, a plurality of the scale-like powders 9 and the binder 10 does not fall off in lump at once so that a large step portion could not be generated, preventing deterioration of sweeping property.

Figure 7A:
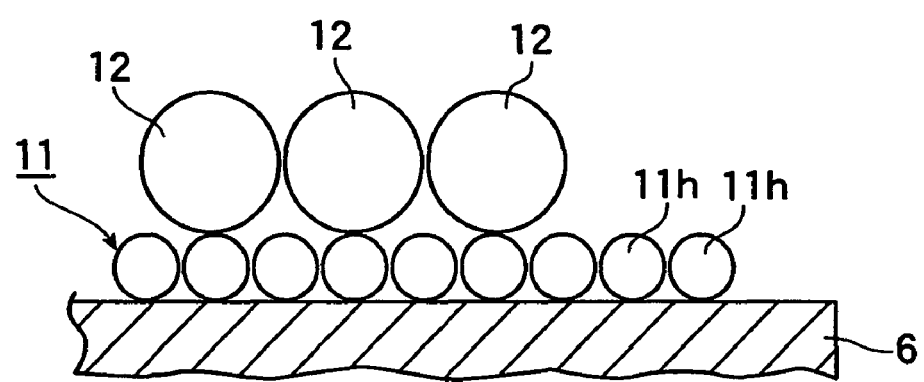
FIG. 7a shows an example of the wiper blade of the present invention and an enlarged explanatory drawing schematically showing a relationship between the sweeping surface layer portion and a glass window and an action of the binder, also shows a state of an initial stage of the sweeping operations.

Before the sweeping operation, as shown in FIG. 7a, a water repellent component 11h of the water repellent layer 11 is formed up in line without space on the surface of the glass window 6 and a rain drop 12 is on the repellent layer 11. When the rain drop 12 is swept by the wiper blade 1 of the present invention on which the sweeping surface layer portion 7, that comprises the scale-like powder 9 and the binder 10 which fixes the scale-like powder 9 onto the surface of a sweep portion, is formed, the surface of the sweeping surface layer portion 7 is worn out with the progress of the sweeping operation. And the scale-like powder 9 falls off the sweeping surface layer portion 7. And at the same time the binder 10 which binds the scale-like powder 9 also falls off. Thus the thickness of the front edge portion of the sweeping surface layer portion 7 which relates to sweeping operation becomes thinner. And at last the front edge surface 5 of the lip portion 4 is also slightly worn out.

Figure 7B:
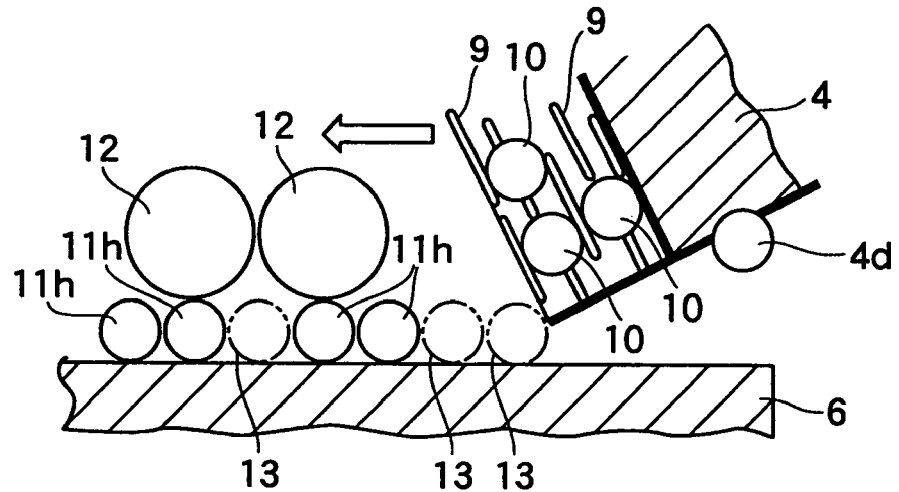
FIG. 7b shows an example of the wiper blade of the present invention and an enlarged explanatory drawing schematically showing a relationship between the sweeping surface layer portion and the glass window and an action of the binder, also shows a state that a portion of the water repellent layer is scraped away after repeated sweeping operations.
Figure 7C:
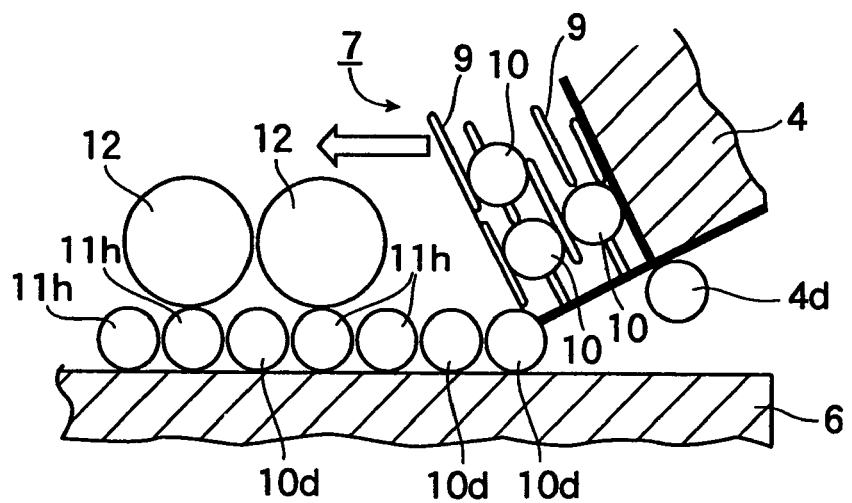
FIG. 7c shows an example of the wiper blade of the present invention and an enlarged explanatory drawing schematically showing a relationship between the sweeping surface layer portion and the glass window and an action of the binder, FIG. 7c showing a state the water repellent layer is repaired after repeated sweeping operations.

Further, both the binder 10 which falls off the sweeping surface layer portion 7 and the lip portion 4 of the wiper blade 1 are made of the water repellent silicone base rubber composition comprising organopolysiloxane which has a basic structure of siloxane bond. The binder 10 and the lip portion 4 are made of similar component to that of the water repellent layer 11. Therefore as shown in FIGS. 7b and 7c, the fallen-off component 10d of the binder 10 or the fallen-off component 4d of the lip portion 4 goes into a depressed portion 13 of the water repellent component 11h of the water repellent layer 11, the depressed portion being made by scraping action of the lip portion 4 of the wiper blade 1 during the sweeping operation, so that the scraped portion of the water repellent layer is repaired.

The repairing action which repairs the water repellent layer 11 by the fallen-off component 10d of the binder 10 or the fallen-off component 4d of the lip portion 4 is very important in the present invention.

During the sweeping operation of the wiper blade 1, the lip portion 4 is inclined around the neck portion 2 toward a direction opposite to the moving direction of the wiper blade 1. Thus the side surface of the lip portion 4 is brought into a condition of sweeping the glass window 6. Therefore the sweeping surface layer portion 7 is always pressing the water repellent layer 11. Accordingly, the fallen-off component 10d of the binder 10 and the fallen-off component 4d of the lip portion 4 are not only led to the depressed portion 13 of the water repellent component 11h of the water repellent layer 11, but also rubbed into the depressed portion 13 of the water repellent component 11h of the water repellent layer 11. Moreover the fallen-off component 10d of the binder 10 and the fallen-off component 4d of the lip portion 4 have a component similar to that in the water repellent layer 11 so that the water repellent layer 11 is repaired satisfactorily. Furthermore the fallen-off component 10d of the binder 10 and the fallen-off component 4d of the lip portion 4 have water repellent characteristics so that the function of the water repellent layer 11 can be maintained.

Next, the function of the scale-like powder 9 which falls off the sweeping surface layer portion 7 will be explained.

The scale-like powder 9 which falls off the sweeping surface layer 7 is at first scattered on the water repellent layer 11, but is washed out of the glass window 6 by rain or is sweeped and pushed away toward a turning back portion where the wiper blade 1 is turned back when the wiper blade 1 is operated. In other words, the scale-like powder 9 is wiped away from the water repellent layer 11 together with water droplets, dust etc. during the sweeping operation of the wiper blade 1. At the same time another scale-like powder 9 is continuously falls off the sweeping surface layer 7 so that a constant amount of the scale-like powder 9 is evenly distributed on the water repellent layer 11 during the sweeping operation of the wiper blade 1.

Figure 8:
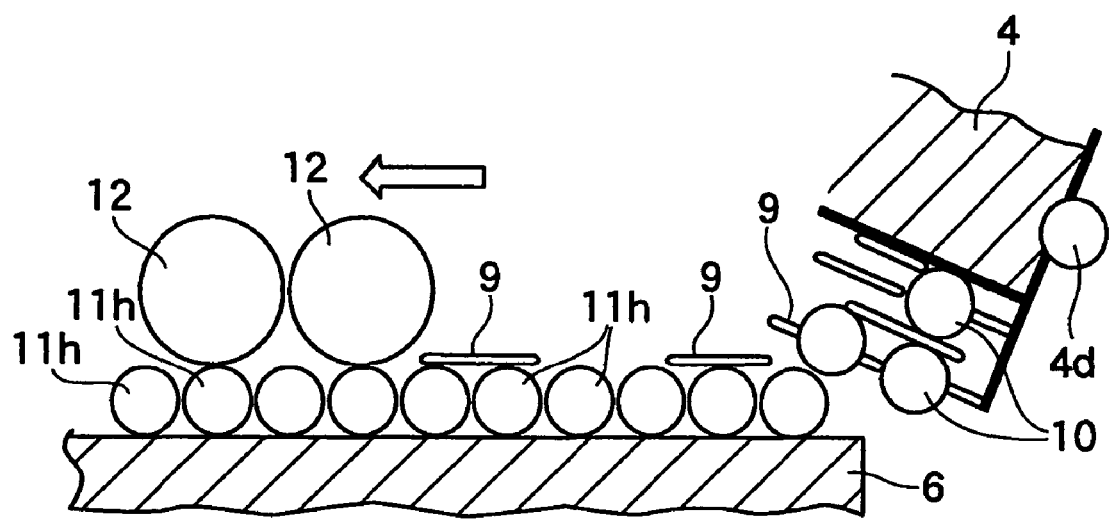
FIG. 8 shows an example of the wiper blade of the present invention and an enlarged explanatory drawing schematically showing a relationship between the sweeping surface layer portion and the glass window and an action of the scale-like powder.

FIG. 8 is an enlarged explanatory drawing schematically showing the wiper blade moving on the glass window and the operation of the scale-like powder.

During the sweeping operation of the wiper blade 1, the sweeping surface layer portion 7 of the wiper blade 1 moves in a rubbing manner on the scale-like powder 9 which is distributed almost evenly on the water repellent layer 11. At this moment, all the scale-like powder 9 on the water repellent layer 11 is not swept away, that is, some of which are swept away but some of which remains on the water repellent layer. The large-size scale-like powders 9 fallen off from the sweeping surface layer 7, have a resistance to displacement so that they tend to remain on the water repellent layer 11. But they are gradually swept away toward the turning back portion of the wiper blade 1 with the progress of the sweeping operation of the wiper blade 1, and at last they are swept away from the water repellent layer 11.

In other words, when the scale-like powder 9 is swept by the sweeping surface layer 7 of the wiper blade 1, the scale-like powder 9 is displaced in a dragging manner together with a movement of an outer surface of the sweeping surface layer 7. And when the scale-like powder 9 is not swept away by the sweeping surface layer 7 of the wiper blade 1, the sweeping surface layer 7 passes over the scale-like powder 9 which remains on the water repellent layer 11.

In any events, the sweeping operation of the wiper blade 1 progress under the condition that the scale-like powder 9 is placed between the water repellent layer 11 and the outer surface of the sweeping surface layer 7, therefore sliding resistance of the wiper blade 1 becomes extremely low, obtaining a good sliding property.

Accordingly, in the wiper blade 1 of the present invention, the depressed portion 13 in the water repellent layer 11, which is formed by the scraping action of the sweeping operation of the wiper blade 1, is repaired by the binder 10 which falls off the sweeping surface layer portion 7 with the progress of the sweeping operation of the wiper blade 1. At the same time, the scale-like powder 9 which falls off the sweeping surface layer 7 is distributed evenly on the water repellent layer 11 on which the sweeping surface layer 7 moves repeatedly, therefore the water repellency of the water repellency layer 11 can be maintained for a long period of time in use, maintaining good sliding property.

In addition, although the scale-like powder 9 is evenly distributed on the glass window 6 during the sweeping operation of the wiper blade, visibility of the driver does not interfere because the particle diameter of the scale-like powder 9 is such a small dimension in the range of 0.3~60 μm and the scale-like powder 9 does not overlap with each other due to the repeating sweeping operation by the sweeping surface layer 7 of the wiper blade 1.

Although the present invention is explained only about the glass window 6 having the water repellent layer 11, but the present invention can also be applied to a glass window 1 having no water repellent layer 11 to give an excellent sliding property because of the presence of the scale-like powder 9. In a case where no repellent layer 11 is coated on the glass window, the binder 10 which falls off the sweeping surface layer 7 is swept away from the glass window 1 by the sweeping operation of the wiper blade 1 or washed away from the glass window 1 by rain water.

EXAMPLES

Next, examples of the present invention and comparative examples for evaluating the examples are described below. The present invention is not limited to these examples.

At first, test results of some of the examples and comparative examples will be explained below to confirm the sliding frictional performances of some wiper blades.

Example 1

Two parts by weight of curing agent "C-8" (product by Shin-Etsu Chemical Co., Ltd, 2,5-dimethyl-2,5-bis(2-butyl peroxy)hexane) was added to 100 parts by weight of silicone rubber compound "KE-571u" (product by Shin-Etsu Chemical Co., Ltd.) and the mixture was fully kneaded on a two-roll mill, then sheeted in an appropriate thickness and length. The sheeted silicone rubber composition was molded by a heating compression molding (molding conditions: 170° C., 4 minutes) into a two-juncturally-connected wiper blade body in which front edge surface sides of respective two wiper blades were united with each other. The molded two-juncturally-connected wiper blade body was subjected to a secondary cure in a forced draft vent type oven (heating condition: 200° C., 2 hours).

At the same time, into 100 parts by weight of a toluene solution having 3% by weight of methyl vinyl silicone type rubber composition, 5 parts by weight of natural graphite "BF-10A" (product by Chuetsu Kokuen Kogyo Co., Ltd., particle size distribution by sedimentation type particle size distribution analysis: 1~55 µm, average particle size: 10 µm, scale-like shape) and 0.02 parts by weight of platinum catalyst "CAT-PL-2-10" (product by Shin-Etsu Chemical-Co., Ltd.) were added and fully mixed.

The thus obtained solution was spray-coated on the two-juncturally-connected wiper blade body and heat-treated at 180° C. for 10 minutes. The average thickness of the coated layer (sweeping surface layer portion 7) was 20 µm and adhering amount of the powder was 1.2 mg/cm². The heat-treated two-juncturally-connected wiper blade body was cut to be separated by placing rotating blades on both upside and downside of the moldings, obtaining two wiper blades 1 the whole of which was made of the same silicone base rubber composition. Hardness of the cured silicone rubber base composition which formed the lip portion 4 was 68, whereas hardness of the cured silicone rubber base composition used for fixing the powder was 50.

Example 2

Example 2, was carried out in the same manner as in Example 1 except that natural graphite "BF-5A" (product by Chuetsu Kokuen Kogyo Co., Ltd., particle size distribution by sedimentation type particle size distribution analysis: 1~25 µm, average particle size: 5 µm, scale-like shape) was used instead of natural graphite "BF-10A," obtaining two wiper blades 1. Hardness of the cured silicone rubber base composition was 68, whereas hardness of the cured silicone rubber base composition used for fixing the powder was 50.

Comparative Example 1

In Comparative Example 1, a commercially available wiper blade (product by Nihon Wiper Blade Co., Ltd.) made of natural rubber was used.

Comparative Example 2

Comparative Example 2 was carried out in the same manner as in Example 1 except that a powder "God Ball E-2C" is used as a powder (product by Suzuki Yushi Industrial Co., Ltd, a porous silica, particle size distribution by sedimentation type particle size distribution analysis: 0.5~3 µm, average particle size: 1.0 µm, spherical shape), obtaining two wiper blades 1. Hardness of the cured silicone rubber base composition was 68, whereas hardness of the cured silicone rubber base composition used for fixing the powder was 50.

Comparative Example 3

Comparative Example 3 was carried out in the same manner as in Example 1 except that the average thickness of the coated layer (sweeping surface layer portion 7) was 2 µm, adhering amount of the powder was 0.09 mg/cm² and the average adhering amount of the silicone base rubber composition was 0.04 mg/cm², obtaining two wiper blades 1. Hardness of the cured silicone rubber base composition was 68, whereas hardness of the cured silicone rubber base composition used for fixing the powder was 50.

[Evaluation Test 1]

A testing device according to one which is specified by JIS-D5710 was used to evaluate wiping and wiping durability performances. The surface of a glass window 6 of the testing device was treated with a water repellent treatment agent "Ultra Glaco" (product by Soft 99 Corporation, a silane compound) and left it to stand for a day. Thereafter the wiper blade was attached and then operated under the condition of no water and water spraying evenly on the surface of the glass window at a water volume of 500 ml/min. The evaluation was made by measuring the operating current value and by changing the value into an index in which the commercially available wiper blade (Comparative Example 1) made of natural rubber was set to 100.

As a result, in Example 1 of the wiper blade of the present invention, the operating current value under the condition of no water was 85, the value under the condition of water spraying was 93. In Example 2, the value under no water was 87, and the value under water spraying was 94. That is, Example 1 and 2 are improved in sliding property by 13~15% under no water and by 6~7% under water spraying when compared with the commercially available wiper blade (Comparative Example 1) made of natural rubber.

On the contrary, the operating current value of Comparative Example 2, in which the spherical powder was used instead of the scale-like powder in Example 1 and 2, was 97 when water was not used and was 98 when water was sprayed, showing that sliding property was not so much improved when compared with the commercially available wiper blade (Comparative Example 1) made of natural rubber.

Furthermore, the operating current value of Comparative Example 3, in which the sweeping surface layer portion 7 was made thinner, was 97 when water was not used and was 97 when water was sprayed, showing that sliding property was slightly improved when compared with the commercially available wiper blade (Comparative Example 1) made of natural rubber or the wiper blade (Comparative Example 2) in which the spherical powder was used.

[Evaluation Test 2]

The surface of the glass window 6 of the testing device in Example 1 was treated with the water repellent treatment agent "Ultra Glaco" (product by Soft 99 Corporation, a silane compound) and left it to stand for a day. Thereafter the wiper blade 1 was attached and then operated at a operating speed of 40 times/min. for a long period of time under the condition of spraying water evenly on the surface of the glass window 6 at a water spray of 500 ml/min. More precisely, water repellent condition was observed every 50,000 repeating operations up to 300,000 operations, that is observation was carried out 6 times in total.

As a result, in Comparative Example 1, falling off of the water repellent layer 11 was first found at the 50,000th time of wiping in the area on which the wiper was operating. And more than 20% of the total area on which the wiper was operating was found to fall off the water repellent layer 11 at the 150,000th time of wiping. In the case of Example 1 and 2, in which scale-like graphite was used, no falling off of the water repellent layer 11 was found even after 250,000th times of operation, showing good sliding property. But in comparative Example 2, in which the spherical powder was used, falling off of the water repellent layer 11 could be prevented until up to the maximum operation times of 250,000. After 250,000, fluttering was observed with increase in the number of operation. Furthermore in Comparative Example 3, in which the scale-like graphite was used as a powder but the thickness of the sweeping surface layer portion 7 was thin (2 μm), falling off of the water repellent layer 11 was found at the 200,000th time of wiping in the area on which the wiper was operating, resulting in that durability in the Comparative Example 3 was poor when compared with Example 1 and Example 2 in which the thickness of the sweeping surface layer portion 7 were thick (20 μm).

Next, examples and comparative examples for evaluating wiping performance by observing the fluttering and imperfect wiping, and their test results will be explained below.

Example 3

Two parts by weight of curing agent "C-8" (product by Shin-Etsu Chemical Co., Ltd., 2,5-dimethyl-2,5-bis(2-butyl peroxy)hexane) was added to 100 parts by weight of silicone rubber compound "KE-571u" (product by Shin-Etsu Chemical Co., Ltd.) and the mixture was fully kneaded on a two-roll mill, then sheeted in an appropriate thickness and length. The sheeted silicone rubber composition was molded by a heating compression molding (molding conditions: 170° C., 4 minutes) into a two-juncturally-connected wiper blade body in which front edge surface sides of respective two wiper blades were united with each other. The molded two-juncturally-connected wiper blade body was subjected to a secondary cure in a forced draft vent type oven (heating condition: 200° C., 2 hours).

At the same time, into 100 parts by weight of a toluene solution having 6% by weight of methyl vinyl silicone type rubber composition, 10 parts by weight of natural graphite "BF-10A" (product by Chuetsu Kokuen Kogyo Co., Ltd., particle size distribution by sedimentation type particle size distribution analysis: 1~55 μm, average particle size: 10 μm, scale-like shape) and 0.08 parts by weight of platinum catalyst "CAT-PL-2-10" (product by Shin-Etsu Chemical Co., Ltd.) were added and fully mixed.

The thus obtained solution was spray-coated on the two-juncturally-connected wiper blade body and then heat-treated at 180° C. for 10 minutes. The average thickness of the coated layer (sweeping surface layer portion 7) was 20 μm and adhering amount of powder was 1.2 mg/cm$^2$, a ratio of powder/binder; 1/0.6, center-line-average roughness (Ra) of the outer surface; 2.3 μm.

The heat-treated two-juncturally-connected wiper blade body was cut to be separated by placing rotating blades on both upside and downside of the wiper blade body, obtaining two wiper blades 1 the whole of which was made of the same silicone base rubber composition. Hardness of the cured silicone base rubber composition which formed the lip portion 4 was 68, whereas hardness of the cured silicone base rubber composition used for fixing the powder was 50.

Example 4

In Example 4, a two-juncturally-connected wiper blade body was molded in the same manner as in Example 3 and subjected to a secondary cure in a forced draft vent type oven (heating condition: 200° C., 2 hours).

At the same time, into 100 parts by weight of a toluene solution having 6% by weight of methyl vinyl silicone type rubber composition, 6.7 parts by weight of natural graphite "BF-10A" (product by Chuetsu Kokuen Kogyo Co., Ltd., particle size distribution by sedimentation type particle size distribution analysis: 1~55 μm, average particle size: 10 μm, scale-like shape) and 0.08 parts by weight of platinum catalyst "CAT-PL-2-10" (product by Shin-Etsu Chemical Co., Ltd.) were added and fully mixed.

The thus obtained solution was spray-coated on the two-juncturally-connected wiper blade body and then heat-treated at 180° C. for 10 minutes. The average thickness of the coated layer (sweeping surface layer portion 7) was 20 μm and adhering amount of the powder was 1.0 mg/cm$^2$, a ratio of powder/binder; 1/0.9, center-line-average roughness (Ra) of the outer surface; 1.8 μm.

The heat-treated two-juncturally-connected wiper blade body was cut to be separated by placing rotating blades on both upside and downside of the wiper blade body, obtaining two wiper blades 1 the whole of which was made of the same silicone base rubber composition. Hardness of the cured silicone rubber base composition which formed the lip portion 4 was 68, whereas hardness of the cured silicone rubber base composition used for fixing the powder was 50.

Example 5

In Example 5, a two-juncturally-connected wiper blade body was molded in the same manner as in Example 3 and subjected to a secondary cure in a forced draft vent type oven (heating condition: 200° C., 2 hours).

At the same time, into 100 parts by weight of a toluene solution having 6% by weight of methyl vinyl silicone type rubber composition, 5 parts by weight of natural graphite "BF-5A" (product by Chuetsu Kokuen Kogyo Co., Ltd., particle size distribution by sedimentation type particle size distribution analysis: 1~25 μm, average particle size: 5 μm, scale-like shape) and 0.12 parts by weight of platinum catalyst "CAT-PL-2-10" (product by Shin-Etsu Chemical Co., Ltd.) were added and fully mixed.

The thus obtained solution was spray-coated on the two-junctrally-connected wiper blade body and then heat-treated at 180° C. for 10 minutes. The average thickness of the coated layer (sweeping surface layer portion 7) was 20 μm and adhering amount of the powder was 0.85 mg/cm$^2$, a ratio of powder/binder: 1/1.2, center-line-average roughness (Ra) of the outer surface: 1.3 μm.

The heat-treated two-juncturally-connected wiper blade body was cut to be separated by placing rotating blades on both upside and downside of the wiper blade body, obtaining two wiper blades 1 the whole of which was made of the same silicone base rubber composition. Hardness of the cured silicone base rubber composition which formed the lip portion 4 was 68, whereas hardness of the cured silicone base rubber composition used for fixing the powder was 50.

Comparative Example 4

A wiper blade 1 of the Comparative Example 4 was obtained in the same manner as in Example 3 except that the average thickness of the coated layer (sweeping surface layer portion 7) was 1 μm. The adhering amount of the powder was 0.06 mg/cm$^2$ and the center-line-average roughness (Ra) of the outer surface was 1.2 μm.

Comparative Example 5

A wiper blade 1 of the Comparative Example 5 was obtained in the same manner as in Example 3 except that the average thickness of the coated layer (sweeping surface layer 7) was 50 μm. The adhering amount of the powder was 3 mg/cm$^2$ and the center-line-average roughness (Ra) of the outer surface was 5.2 μm.

Comparative Example 6

In Comparative Example 6, a two-juncturally-connected wiper blade body was molded in the same manner as in Example 3 and subjected to a secondary cure in a forced draft vent type oven (heating condition: 200° C., 2 hours).

Natural graphite "BF-10A" (product by Chuetsu Kokuen Kogyo Co., Ltd., particle size distribution by sedimentation type particle size distribution analysis: 1~55 μm, average particle size: 10 μm, scale-like shape) was directly sprinkled on the lip portion 4 of the two-juncturally-connected wiper blade body and made even in thickness to adhere to the lip by leveling off the surface of the particle layer using a brush. The average thickness of the scale-like powder 9 was 1 μm.

Comparative Example 7

In comparative Example 7, a two-juncturally-connected wiper blade body was molded in the same manner as in Example 3 and subjected to a secondary cure in a forced draft vent type oven (heating condition: 200° C., 2 hours).

At the same time, into a 100 parts by weight of a toluene solution having 6% by weight of methyl vinyl silicone type silicone rubber composition, 3.4 parts by weight of natural graphite "BF-10A" (product by Chuetsu Kokuen Kogyo Co., Ltd., particle size distribution by sedimentation type particle size distribution analysis: 1~55 μm, average particle size: 10 μm, scale-like shape) and 0.08 parts by weight of platinum catalyst "CAT-PL-2-10" (product by Shin-Etsu Chemical Co., Ltd.) were added and fully mixed.

The thus obtained solution was spray-coated on the two-juncturally-connected wiper blade body and then heat-treated at 180° C. for 10 minutes. The average thickness of the coated layer (sweeping surface layer portion 7) was 20 μm and adhering amount of the powder was 0.7 mg/cm$^2$, a ratio of powder/binder: 1/1.8, and center-line-average roughness (Ra) of the outer surface: 1.4 μm.

The heat-treated two-juncturally-connected wiper blade body was cut to be separated by placing rotating blades on both upside and downside of the wiper blade body, obtaining two wiper blades 1 the whole of which was made of the same silicone base rubber composition. Hardness of the cured silicone base rubber composition which formed the lip portion 4 was 68, whereas hardness of the cured silicone base rubber composition used for fixing the powder was 50.

Comparative Example 8

In Comparative Example 8, a two-juncturally-connected wiper blade body was molded in the same manner as in Example 3 and subjected to a secondary cure in a forced draft vent type oven (heating condition: 200° C., 2 hours).

At the same time, into a 100 parts by weight of a toluene solution having 6% by weight of methyl vinyl silicone type rubber composition, 10 parts by weight of natural graphite "BF-3A" (product by Chuetsu Kokuen Kogyo Co., Ltd., particle size distribution by sedimentation type particle size distribution analysis: 0.2~15 μm, average particle size: 3 μm, particle shape: scale-like) and 0.08 parts by weight of platinum catalyst "CAT-PL-2-10" (product by Shin-Etsu Chemical Co., Ltd.) were added and fully mixed.

The thus obtained solution was spray-coated on the two-juncturally-connected wiper blade body and then heat-treated at 180° C. for 10 minutes. The average thickness of the coated layer (sweeping surface layer portion 7) was 20 μm and adhering amount of the powder was 1.2 mg/cm$^2$, a ratio of powder/binder: 1/0.6, and center-line-average roughness (Ra) of the outer surface: 1.1 μm.

The heat-treated two-juncturally-connected wiper blade body was cut to be separated by placing rotating blades on both upside and downside of the wiper blade body, obtaining two wiper blades 1 the whole of which was made of the same silicone base rubber composition. Hardness of the cured silicone base rubber composition which formed the lip portion 4 was 68, whereas hardness of the cured silicone base rubber composition used for fixing the powder was 50.

Comparative Example 9

In Comparative Example 9, a two-juncturally-connected wiper blade body was molded in the same manner as in Example 3 and subjected to a secondary cure in a forced draft vent type oven (heating condition: 200° C., 2 hours).

At the same time, into a 100 parts by weight of a toluene solution having 6% by weight of methyl vinyl silicone base rubber composition, 10 parts by weight of natural graphite "BF-20A" (product by Chuetsu Kokuen Kogyo Co., Ltd., particle size distribution by sedimentation type particle size distribution analysis: 1~125 μm, average particle size: 20 μm, scale-like shape) and 0.08 parts by weight of platinum catalyst "CAT-PL-2-10" (product by Shin-Etsu Chemical Co., Ltd.) were added and fully mixed.

The thus obtained solution was spray-coated on the two-juncturally-connected wiper blade body and then heat-treated at 180° C. for 10 minutes. The average thickness of the coated layer (sweeping surface layer portion 7) was 20 μm and adhering amount of the powder was 1.2 mg/cm$^2$, a ratio of powder/binder: 1/0.6, and center-line-average roughness (Ra) of the outer surface: 5.2 μm.

The heat-treated two-juncturally-connected wiper blade body was cut to be separated by placing rotating blades on both upside and downside of the wiper blade body, obtaining two wiper blades 1 the whole of which was made of the same silicone base rubber composition. Hardness of the cured silicone base rubber composition which formed the lip portion 4 was 68, whereas hardness of the cured silicone base rubber composition used for fixing the powder was 50.

Example 6

In Example 6, a two-juncturally-connected wiper blade body was molded in the same manner as in Example 3 and subjected to a secondary cure in a forced draft vent type oven (heating condition: 200° C., 2 hours).

At the same time, into a 100 parts by weight of a toluene solution having 6% by weight of methyl vinyl silicone type rubber composition, 10 parts by weight of mica "A-500"

(product by Yamaguchi Mica Co., Ltd., average particle size: 9~14 μm, scale-like shape) and 0.08 parts by weight of platinum catalyst "CAT-PL-2-10" (product by Shin-Etsu Chemical Co., Ltd.) were added and fully mixed.

The thus obtained solution was spray-coated on the two-juncturally-connected wiper blade body and then heat-treated at 180° C. for 10 minutes. The average thickness of the coated layer (sweeping surface layer portion 7) was 20 μm and adhering amount of powder was 1.4 mg/cm$^2$, a ratio of powder/binder: 1/0.6, and center-line-average roughness (Ra) of the outer surface: 2.2 μm.

The heat-treated two-juncturally-connected wiper blade body was cut to be separated by placing rotating blades on both upside and downside of the wiper blade body, obtaining two wiper blades 1 the whole of which was made of the same silicone base rubber composition. Hardness of the cured silicone base rubber composition which formed the lip portion 4 was 68, whereas hardness of the cured silicone base rubber composition used for fixing the powder was 50.

Example 7

In Example 7, a wiper blade 1 was obtained in the same manner as in Example 6 except that the average thickness of the coated layer (sweeping surface layer portion 7) was 5 μm, an adhering amount of the powder: 0.4 mg/cm$^2$, and a center-line-average roughness (Ra) of the outer surface: 1.2 μm.

Comparative Example 10

In Comparative Example 10, a wiper blade 1 was obtained in the same manner as in Example 3 except that "B-72" (product by Yamaguchi Mica Co., Ltd., mica, average particle size: 300 μm, scale-like shape) was used as a powder and the average thickness of the coated-layer (sweeping surface layer portion 7) was 50 μm, and adhering amount of powder was 3.8 mg/cm$^2$, a ratio of powder/binder: 1/0.6, and the center-line-average roughness (Ra) of the outer surface: 5.2 μm.

Comparative, Example 11

In Comparative Example 11, a two-juncturally-connected wiper blade body was molded in the same manner as in Example 1 and subjected to a secondary cure in a forced draft vent type oven (heating condition: 200° C., 2 hours).

The heat-treated two-juncturally-connected wiper blade body was cut to be separated by placing rotating blades on both upside and downside of the wiper blade body, obtaining two wiper blades 1 the whole of which was made of the same silicone base rubber composition. No surface treatment was performed to the lip portion 4 of the wiper blade 1.

Comparative Example 12

In Comparative Example 12, a two-juncturally-connected wiper blade body was molded in the same manner as in Example 1 and subjected to a secondary cure in a forced draft vent type oven (heating condition: 200° C., 2 hours).

Next, a 100 parts by weight of water repellent treatment agent "Nurinuri Glaco" (product by Soft 99 Corporation, a silicone compound), 5 parts by weight of natural graphite "BF-10A" (product by Chuetsu Kokuen Kogyo Co., Ltd., particle size distribution by sedimentation type particle size distribution analysis: 1~55 μm, average particle size: 10 μm, scale-like shape) was added and fully mixed.

The thus obtained solution was spray-coated on the lip portion 4 of the two-juncturally-connected wiper blade body and then left it to be dried at room temperature. The average thickness of the coated layer (sweeping surface layer portion 7) was 5 μm. The two-juncturally-connected wiper blade body having the coated layer made of the water repellent treatment agent was cut to be separated by placing rotating blades on both upside and downside of the wiper blade body, obtaining two wiper blades 1.

[Evaluation Test 3]

A testing device according to JIS-D 5710 in which wiping performance and wiping durability performance are evaluated was used. The surface of a glass window 6 of the testing device was treated with a water repellent treatment agent "Nurinuri Glaco" (product by Soft 99 Corporation, a silane compound) and left it to stand for a day. Thereafter a wiper blade was attached and then operated under a condition of no water and water spraying evenly on the surface of the glass window at a water volume of 500 ml/min to observe and evaluate the operational state of the wiper blade. In a case where the wiper blade was in smooth sliding operation without fluttering, the evaluation was rated as "good". Five people joined as panelists and evaluation was carried out by a rule of majority.

As a result, as shown in Table 1, Examples 3 to 7 were all rated as good at their initial sliding state. Comparative Examples 4, 5, 6, 9 and 10 were all rated as good at their initial sliding state, but Comparative Examples 7 and 8 showed fluttering.

TABLE 1

|  | Ex. 3 | Ex. 4 | Ex. 5 | Ex. 6 | Ex. 7 | Comp. Ex. 4 | Comp. Ex. 5 |
| --- | --- | --- | --- | --- | --- | --- | --- |
| Initial sliding state | Good | Good | Good | Good | Good | Good | Good |
| Sliding state after 500,000 times of operation | Good | Good | Good | Good | Good | Fluttering | Good |
| Initial sweeping state | Good | Good | Good | Good | Good | Good | Streak due to imperfect wiping |
| Sweeping state after 500,000 times of operation | Good | Good | Good | Good | Good | Incapable evaluation due to fluttering | Streak due to imperfect wiping |

TABLE 1-continued

| | Comp. Ex. 6 | Comp. Ex. 7 | Comp. Ex. 8 | Comp. Ex. 9 | Comp. Ex. 10 |
|---|---|---|---|---|---|
| Initial sliding state | Good | Fluttering | Fluttering | Good | Good |
| Sliding state after 500,000 times of operation | Fluttering | ※ | ※ | Good | Good |
| Initial sweeping state | Good | Imperfect wiping due to fluttering | Imperfect wiping due to fluttering | Streak due to imperfect wiping | Streak due to imperfect wiping |
| Sweeping state after 500,000 times of operation | Incapable evaluation due to fluttering | ※ | ※ | Streak due to imperfect wiping | Streak due to imperfect wiping |

※ sliding state after 500,000 times of operation was not evaluated due to fluttering occurred at the initial sliding stage

[Evaluation Test 4]

A testing device according to one which is specified by JIS-D5710 in which wiping performance and wiping durability performances are evaluated was used. The surface of a glass window 6 of the testing device was treated with a water repellent treatment agent "Nurinuri Glaco" (product by Soft 99 Corporation, a silane compound) and left it to stand for a day. Thereafter a wiper blade was attached and then operated at an operation speed of 40 times/min. for a long period of time under a condition of water spraying evenly on the surface of the glass window at a water volume of 500 ml/min. More specifically, operation state was observed and evaluated after 500,000 times of operation. In a case where the wiper blade was in smooth sliding operation without fluttering, the evaluation was rated as "good". Five people joined as panelists and evaluation was carried out by a rule of majority.

As a result, as shown in Table 1, Examples 3 to 7 were all rated as good sliding state after 500,000 times of operation. Comparative Examples 5, 9 and 10 were rated as good sliding state after 500,000 times of operation, but Comparative Examples 4 and 6 showed fluttering. In Comparative Examples 7 and 8, evaluation of the sliding state after 500,000 times of operation was not carried out because of fluttering occurred at the initial sliding stage.

[Evaluation Test 5]

A testing device according to one which is specified by JIS-D5710 in which wiping performance and wiping durability performances are evaluated was used. The surface of a glass window 6 of the testing device was treated with a water repellent treatment agent "Nurinuri Glaco" (product by Soft 99 Corporation, a silane compound) and left it to stand for a day. Thereafter a wiper blade was attached and then operated after water was sprayed on all over the surface of the glass window to observe and evaluate the operational state of the wiper blade. In a case where the wiper blade was in smooth sliding operation without fluttering, the evaluation was rated as "good". Five people joined as panelists and evaluation was carried out by a rule of majority.

As a result, as shown in Table 1, Examples 3 to 7 were all rated as good initial wiping property. Comparative Examples 4 and 6 showed good initial wiping property, but in Comparative Examples 5, 9 and 10, a streak which was derived from imperfect wiping was observed. Comparative Examples 7 and 8 could not be evaluated on wiping property because of generation of fluttering.

[Evaluation Test 6]

A testing device according to one which is specified by JIS-D5710 in which wiping performance and wiping durability performances are evaluated was used. The surface of a glass window 6 of the testing device was treated with a water repellent treatment agent "Nurinuri Glaco" (product by Soft 99 Corporation, a silane compound) and left it to stand for a day. Thereafter a wiper blade 1 was attached and then operated at an operation speed of 40 times/min. for a long time under a condition of water stray evenly on the surface of the glass window at a water volume of 500 ml/min. More specifically, operational state was observed and evaluated after 500,000 times of operation. In a case where no fluttering was observed and no streak derived from imperfect wiping was observed, the evaluation was rated as "good". Five peoples joined as panelists and evaluation was carried out by a rule of majority.

As a result, as shown in Table 1, Examples 3 to 7 were all rated as good wiping property after 500,000 times of operation. Comparative Examples 4 and 6 showed fluttering. Comparative Examples 5, 9 and 10 showed a streak derived from imperfect wiping. In Comparative Examples 7 and 8, evaluation of the wiping state after 500,000 times of operation was not carried out because of fluttering occurred at the initial state of wiping property test.

[Evaluation Test 7]

A test device according to one which is specified by JIS-D 5710 in which wiping performance and wiping durability performances are evaluated was used. The surface of a glass window 6 of the testing device was treated with a water repellent treatment agent "Nurinuri Glaco" (product by Soft 99 Corporation, a silane compound) and left it to stand for a day. Thereafter a wiper blade 1 was attached and then operated at an operation speed of 40 times/min. for a long period of time under a condition of water spraying evenly on the surface of the glass window at a water volume of 500 ml/min. More specifically, in Examples 1 and 3 and Comparative Examples 1, 11 and 12, operational state and water repellent state were observed and evaluated at every 50,000 times of operation from 50,000th time to 300,000th time, that is observation was carried out 6 times in total.

As a result, Examples 1 and 2 showed good sliding property even after 300,000 times of operation and no falling off of the water repellent layer 11 was observed. Comparative Example 1 showed fluttering at its initial operation stage and falling off of the water repellent layer 11 was found after 50,000 times of operation and more than 20% of wiping area of the water repellent layer 11 fell off after 150,000 times of operation. Comparative Example 11 showed generation of fluttering at its initial stage and falling off of the water repellent layer 11 was found after 100,000 times of operation. And more than 10% of wiping area of the water repellent layer 11 fell off after 150,000 times of operation. Comparative Example 12 showed good at its initial stage of operation but showed an early falling off of the scale-like powder 9 and fluttering thereafter. Furthermore falling off of the water repellent layer 11 in comparative example 12 was observed after 150,000 times of operation and more than 20% of wiping area fell off from the water repellent layer 11 after 200,000 times of operation.

From the above mentioned results, the wiper blade 1 of the present invention can be considerably improved in sliding property by forming the sweeping surface layer portion 7 comprising the scale-like powder 9 having a good sliding property and the binder 10 comprising the silicone base rubber composition having water repellency which is used for fixing the scale-like powder 9 to the lip portion 4, increasing in resistance to scraping away of the water repellent layer 11 which was formed on the glass window 6. If the water repellent layer 11 is scraped away by the wiper blade 1, the scraped away (or depressed) portion 13 is filled up with fallen-off component 10d of the binder 10 or another fallen-off component 4d of the lip portion 4, gradually repairing the depressed portion 13. Therefore, the water repellent layer 11 is substantially prevented from scraping away. Furthermore, water repellency of the water repellent layer 11 can be maintained for a long period of time because the fallen-off component 10d of the binder 10 and another fallen-off component 4d of the lip portion 4 is composed of a similar component having water repellency to that of the water repellent layer 11.

INDUSTRIAL APPLICABILITY

The present invention is intended to further improve sliding property of a wiper blade having a powder giving good sliding property to maintain a good sliding performance and also quietness during operation and to further assure stable quality so that the wiper blade of the present invention can be used for various transportation means such as cars, trains, ships, aircrafts etc. in which good driving visibility is required.

The invention claimed is:

1. A method for producing a wiper blade having
   a base portion to be attached to a wiper arm,
   a lip portion for sweeping away foreign materials adhering to a surface of a glass window, the lip portion being made of a silicone based rubber composition,
   a neck portion connecting the lip portion and the base portion, the neck portion being thinner than adjoining parts of the lip portion and the base portion, and
   a sweeping surface layer portion formed on a side surface of the lip portion, the sweeping surface layer portion comprising a scaly powder and a binder which includes a water-repellency silicone-based rubber composition for binding the scaly powder to the lip portion, wherein the silicone-based rubber composition has a hardness in a range of 40-70 on a durometer type A scale and includes a raw rubber selected from the group consisting of dimethyl silicone raw rubber, methyl vinyl silicone raw rubber, methyl phenyl vinyl silicone raw rubber and fluoro silicone raw rubber, the method comprising:
   coating the lip portion with a solution comprising the scaly powder, a platinum catalyst and the binder which includes the silicone-based rubber composition; and
   curing the silicone-based rubber composition by heating the wiper blade coated with the solution at 150~200° C. for 5~30 minutes so as to form the sweeping surface layer portion on the lip portion,
   wherein said coating of the lip portion is carried out such that particles of the scaly powder are laminated in a thickness direction of the lip portion, the thickness direction being perpendicular to the side surface of the lip portion, such that the particles of the laminated scaly powder are bound to each other with the binder, and such that particles of the scaly powder at an outermost layer of the sweeping surface layer portion in the thickness direction are exposed to air at a surface of the sweeping surface layer portion,
   wherein a compounding ratio of the scaly powder to the binder in the sweeping surface layer portion is 1 to 0.3~1.2 by weight, and an adhering amount of the scaly powder in the sweeping surface layer portion is in the range of 0.1-5 mg/cm$^2$.

2. A method for producing a wiper blade according to claim 1, wherein a thickness of the sweeping surface layer portion is in a range of 3-40 μm.

3. A method for producing a wiper blade according to claim 1, wherein the scaly powder contains graphite, mica or a blend of graphite and mica.

4. A method for producing a wiper blade according to claim 1, wherein a particle diameter of the powder is in a range of 0.3-60 μm as measured by sedimentation type particle size distribution analysis.

5. A method for producing a wiper blade according to claim 1, wherein a particle diameter of the powder is in a range of 1-60 μm as measured by sedimentation type particle size distribution analysis.

* * * * *